(12) United States Patent
Ho

(10) Patent No.: US 7,903,357 B2
(45) Date of Patent: Mar. 8, 2011

(54) ASSEMBLING MECHANISM

(75) Inventor: Wen-Ching Ho, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 132 days.

(21) Appl. No.: 12/478,747

(22) Filed: Jun. 4, 2009

(65) Prior Publication Data

US 2010/0046102 A1 Feb. 25, 2010

(30) Foreign Application Priority Data

Aug. 21, 2008 (TW) .............................. 97131979 A

(51) Int. Cl.
*G02B 7/02* (2006.01)
(52) U.S. Cl. ...................................... 359/828
(58) Field of Classification Search .................. 359/828, 359/827
See application file for complete search history.

(56) References Cited

U.S. PATENT DOCUMENTS 7,796,352 B2 * 9/2010 Teich et al. .................. 359/828

* cited by examiner

*Primary Examiner* — Alicia M Harrington
(74) *Attorney, Agent, or Firm* — Jianq Chyun IP Office

(57) ABSTRACT

An assembling mechanism adapted to assemble a lens module to an optical engine base of a projector includes a fixed base, a fixed bayonet, a movable bayonet, a fixed member, and a movable member. The fixed base is fixed to the optical engine base and includes a restricting cavity. The fixed bayonet is fixed to the fixed base and extends to an open end of the restricting cavity. The movable bayonet is fixed to the lens module. The fixed member is fixed to the optical engine base. The movable member is slidably connected to the lens module. Displacement and rotation of the movable bayonet about the axis relative to the fixed base are restricted when the movable bayonet is moved into the restricting cavity through the open end and rotated about an axis relatively to the fixed base, and the movable member is slid into engagement with the fixed member.

9 Claims, 9 Drawing Sheets

ASSEMBLING MECHANISM

CROSS-REFERENCE TO RELATED APPLICATION

This application claims the priority benefit of Taiwan application serial no. 97131979, filed on Aug. 21, 2008. The entirety of the above-mentioned patent application is hereby incorporated by reference herein and made a part of specification.

BACKGROUND OF THE INVENTION

1. Field of the Invention

The present invention generally relates to an assembling mechanism, and more particularly, to an assembling mechanism for quick assembly and removal of a lens module of a projector.

2. Description of Related Art

With development of the projection display technology and decrease of fabrication cost, projectors have become consumer electronic products. The operation principle of the projector is that the light beam emitted by a light source is converted into an image beam through an optical engine and the image beam is projected through a lens module onto a screen to form an image.

FIG. 1 is a perspective view of a conventional projector including a lens module assembled to an optical engine base. Referring to FIG. 1, in the conventional projector, the lens module 102 of the projector is fastened to the optical engine base 106 of the projector with a plurality of fastening screws 104. However, if the fastening screws 104 are used, an extra tool is required for replacement of the lens module 102. As a result, quick replacement of the lens module of the projector has been impossible.

SUMMARY OF THE INVENTION

Accordingly, the present invention is directed to an assembling mechanism, and the assembling mechanism may achieve quick assembly and removal of a lens module of a projector.

One embodiment of the present invention provides an assembling mechanism adapted to assemble a lens module of a projector to an optical engine base of the projector. The assembling mechanism includes a fixed base, a fixed member, a movable member, at least one fixed bayonet, and at least one movable bayonet. The fixed base is fixedly connected to the optical engine base and includes a restricting cavity. The fixed bayonet is fixedly connected to the fixed base and extends to an open end of the restricting cavity. The movable bayonet is fixedly connected to the lens module. The fixed member is fixedly connected to the optical engine base. The movable member is slidably connected to the lens module. Displacement and rotation of the movable bayonet about the axis relative to the fixed base are restricted when the movable bayonet is moved into the restricting cavity through the open end of the restricting cavity and rotated about an axis relatively to the fixed base, and the movable member is slid into engagement with the fixed member.

According to one embodiment of the present invention, the assembling mechanism further includes a movable ring fixedly connected to the lens module. The movable bayonet is fixedly connected to the movable ring.

According to one embodiment of the present invention, the movable member includes a fixed sliding plate and a movable sliding plate. The fixed sliding plate is fixedly connected to the lens module and includes at least one sliding block. The movable sliding plate includes at least one sliding slot. The movable sliding plate is slidably disposed on the fixed sliding plate by engagement of the sliding block and the sliding slot.

According to one embodiment of the present invention, the sliding block is a screw extending through the sliding slot and fixed to the fixed sliding plate.

According to one embodiment of the present invention, the fixed member includes at least one positioning hole, and the movable member includes at least one positioning pin configured for engagement in the positioning hole.

According to one embodiment of the present invention, the assembling mechanism further includes a fixed electrical connector and a movable electrical connector. The fixed electrical connector is fixedly connected to the fixed base. The movable electrical connector is fixedly connected to the movable member. The fixed electrical connector is coupled to the movable electrical connector when the movable bayonet is restricted from moving along the axis and rotated about the axis relatively to the fixed base.

According to one embodiment of the present invention, the fixed electrical connector is a circuit board, and the movable electrical connector is a probe connector.

According to one embodiment of the present invention, the assembling mechanism further includes at least one resilient pushing member disposed on the fixed base. The movable bayonet comprises a notch, and the resilient pushing member is adapted to insert into the notch.

According to one embodiment of the present invention, the resilient pushing member includes a roller and a resilient tab. The roller is situated in the fixed base and partially protrudes into the restricting cavity. The resilient tab is fixedly connected to the fixed base and configured to cause the roller to resiliently partially protrude into the restricting cavity.

In the embodiment of the present invention described above, quick replacement of the lens module of the projector may be achieved, so as to make repair of the lens module more convenient.

Other objectives, features and advantages of the present invention will be further understood from the further technological features disclosed by the embodiments of the present invention wherein there are shown and described preferred embodiments of this invention, simply by way of illustration of modes best suited to carry out the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
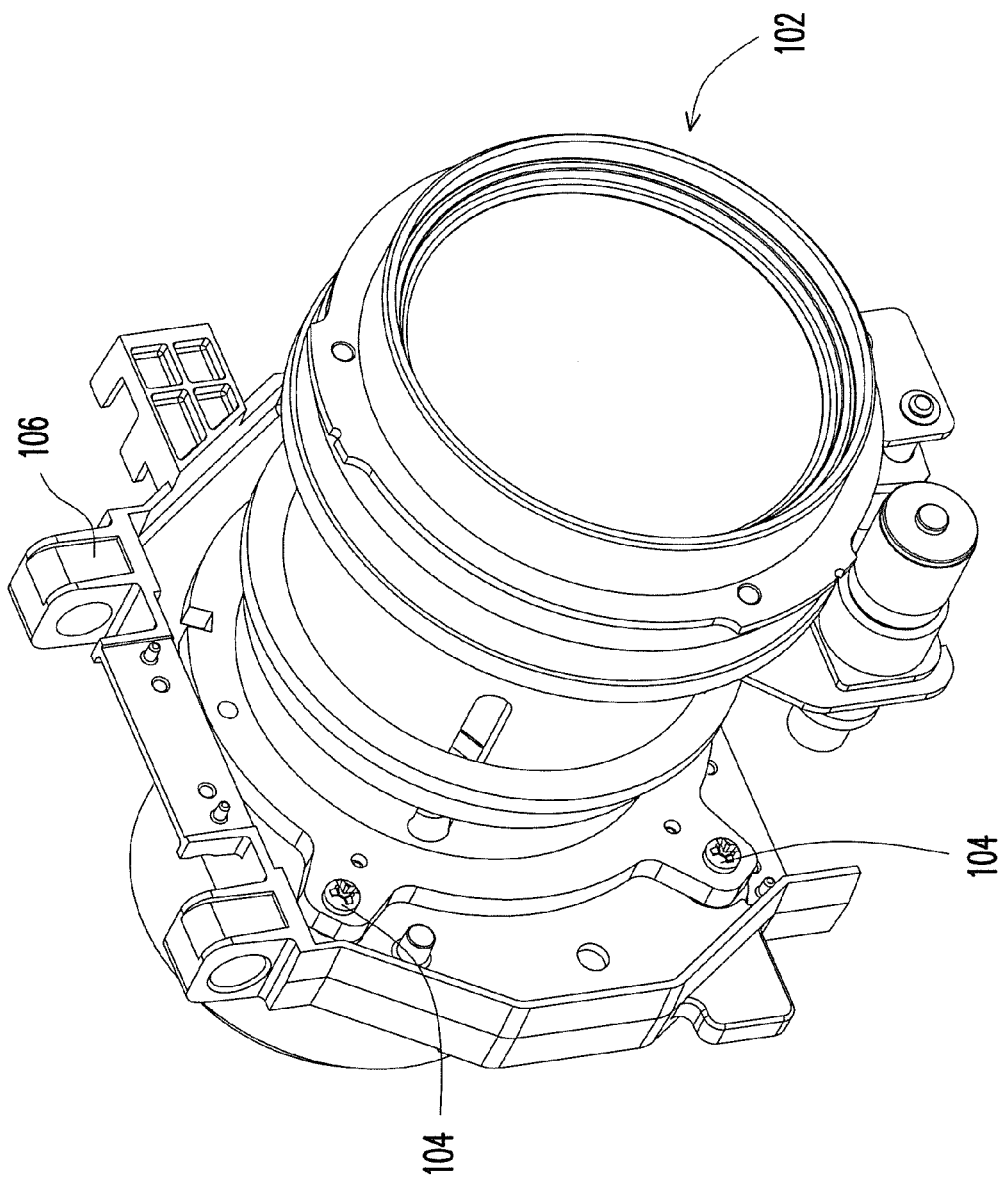
FIG. 1 is a perspective view of a conventional projector including a lens module assembled to an optical engine base.
Figure 2:
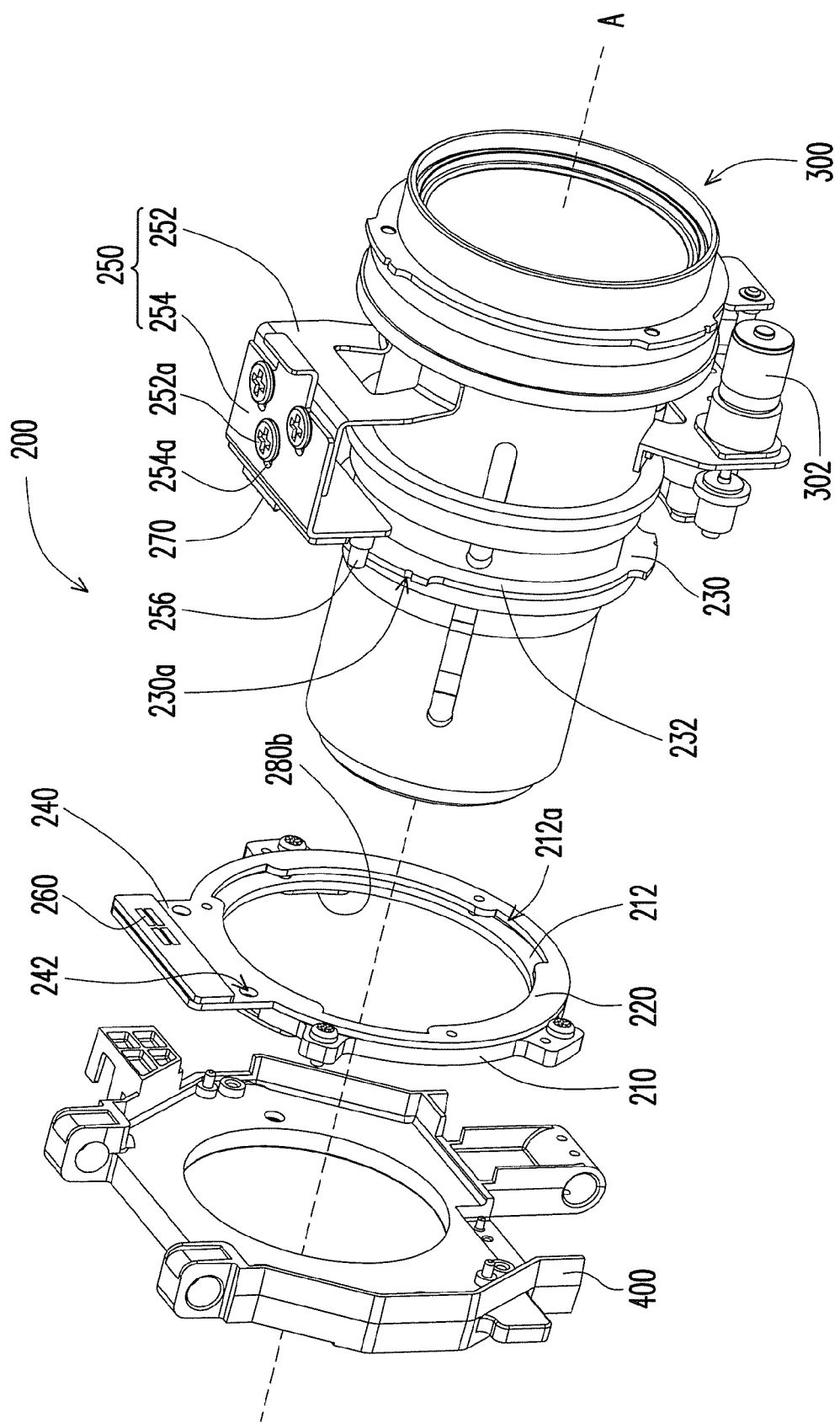
FIG. 2 is an exploded view of an assembling mechanism adapted to assemble a lens module to an optical engine base of a projector according to one embodiment of the present invention.
Figure 3:
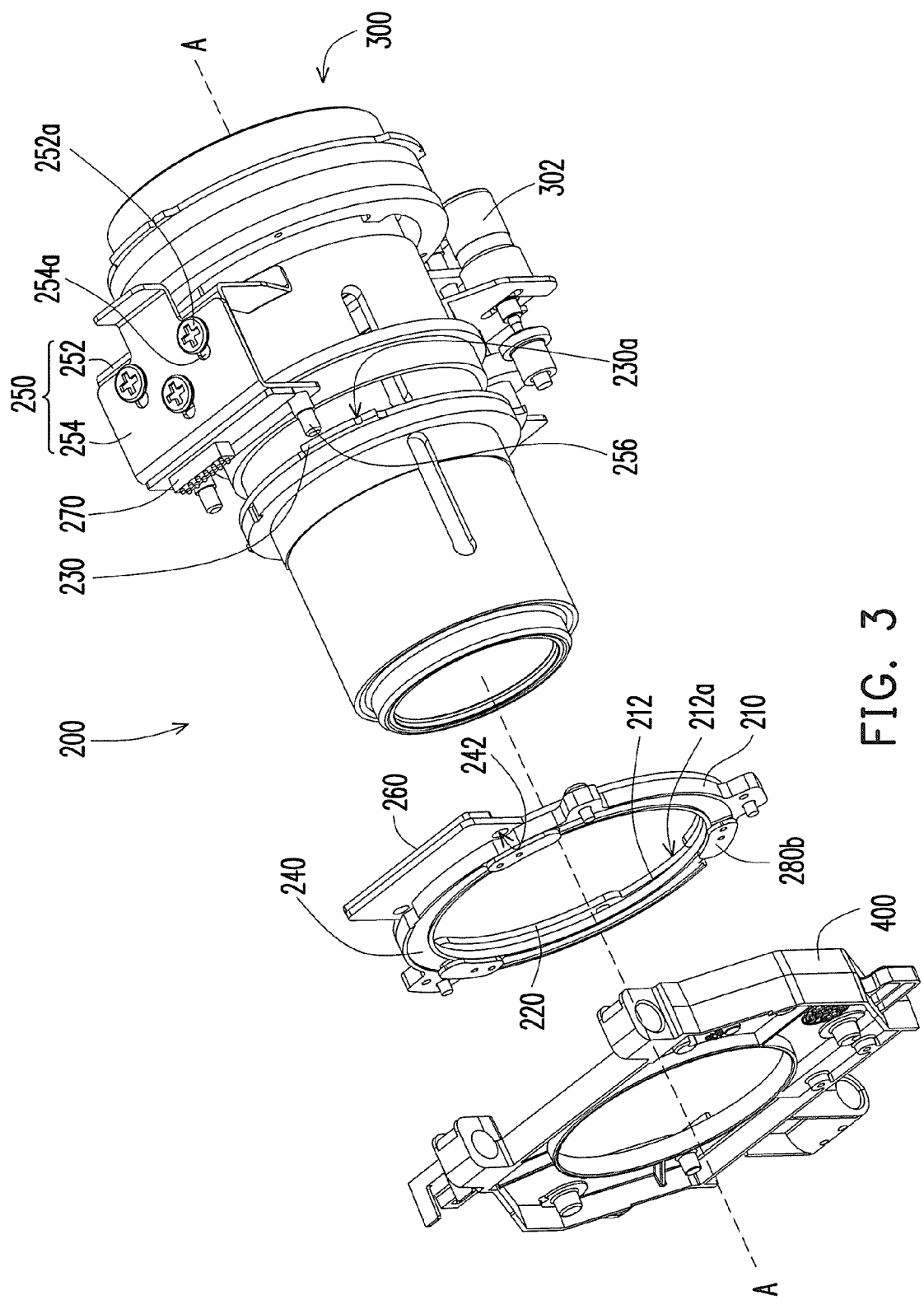
FIG. 3 is another exploded view of the assembling mechanism of FIG. 2 and viewed from another angle.

FIG. 2 is an exploded view of an assembling mechanism adapted to assemble a lens module to an optical engine base of a projector according to one embodiment of the present invention. FIG. 3 is another exploded view of the assembling mechanism of FIG. 2 and viewed from another angle. Referring to FIG. 2 and FIG. 3, in the present embodiment, the lens module 300 is assembled to or removed from the optical engine base 400 of the projector using the assembling mechanism 200 of the present embodiment. The assembling mechanism 200 includes a fixed base 210, a plurality of fixed bayonets 220, a plurality of movable bayonets 230, a fixed member 240, and a movable member 250. The fixed base 210 is fixedly connected to the optical engine base 400 and includes a restricting cavity 212. In the present embodiment, the fixed base 210 may be mounted to the optical engine base 400 with screws in advance.

The fixed bayonets 220 are fixedly connected to the fixed base 210, and each of the fixed bayonets 220 extends to an open end 212a of the restricting cavity 212. In the present embodiment, the assembling mechanism 200 may include three fixed bayonets 220, and the three fixed bayonets 220 are symmetrically arranged about an axis A. However, the present invention is not limited to having three fixed bayonets. In another embodiment not illustrated, the assembling mechanism 200 may include a single fixed bayonet 220.

The movable bayonets 230 are fixedly connected to the lens module 300. In the present embodiment, each of the movable bayonets 230 corresponds to a respective one of the fixed bayonets 220. Therefore, the assembling mechanism 200 may also include three movable bayonets 230 (only two movable bayonets are observed in FIG. 2), and the three movable bayonets 230 are symmetrically arranged. However, the present invention is not limited to having three movable bayonets. In another embodiment not illustrated, the assembling mechanism 200 may include a single movable bayonet 230.

In the present embodiment, the assembling mechanism 200 may further include a movable ring 232 fixedly connected the lens module 300, and the movable bayonets 230 are fixedly connected to the movable ring 232. As such, the movable bayonets 230 may be indirectly fixedly connected to the lens module 300 through the movable ring 232. However, in another embodiment not illustrated, the movable bayonets 230 may also be separately formed and directly attached to the lens module 300.

The fixed member 240 is fixedly connected to the optical engine base 400, and the movable member 250 is slidably connected to the lens module 300. In the present embodiment, the movable member 250 may include a fixed sliding plate 252 and a movable sliding plate 254. The fixed sliding plate 252 is fixedly connected to the lens module 300 and includes a plurality of sliding blocks 252a. In addition, the movable sliding plate 254 includes a plurality of sliding slots 254a. As such, with the engagement of the sliding blocks 252a and the sliding slots 254a, the movable sliding plate 254 may be slidably disposed on the fixed sliding plate 252. In the present embodiment, the sliding block 252a may be a screw extending through a respective one of the sliding slots 254a and fixed to the fixed sliding plate 252.

In the present embodiment, the fixed member 240 has a plurality of positioning holes 242 defined therein, and the movable member 250 includes a plurality of positioning pins 256 corresponding to the positioning holes 242. With the interference between the positioning holes 242 of the fixed member 240 and the positioning pins 256 of the movable member 250, the movable member 250 may be slid into engagement with the fixed member 240, and the fixed base 210 may restrict rotation of the movable bayonets 230 about the axis A. However, the present invention is not limited to the construction described herein. In another embodiment not illustrated, the fixed member 240 may have a single positioning hole 242, and the movable member 250 may have a single positioning pin 256.

FIGS. 4A-4D are views showing the process of assembling the lens module to the optical engine base of FIG. 2 using the assembling mechanism. Referring first to FIG. 2, FIG. 3, FIG. 4A, and FIG. 4B, the lens module 300 is moved toward the optical engine base 400 such that the movable bayonets 230 are slid into the restricting cavities 212 via the opening ends 212a until the movable bayonets 230 engage bottom portions of the restricting cavities 212.

Referring to FIG. 2, FIG. 3, FIG. 4B, and FIG. 4C, after the lens module 300 is disposed in the fixed base 210, the lens module 300 is rotated relatively to the optical engine base 400, such that the movable bayonets 230 are rotated about the axis A to a predetermined angle. In this position, displacement of the movable bayonets 230 along the axis A relative to the fixed base 210 is restricted by the fixed bayonets 220 and the restricting cavities 212.

Referring to FIG. 2, FIG. 3, FIG. 4C, and FIG. 4D, under the condition that the displacement of the movable bayonets 230 along the axis A relative to the fixed base 210 is restricted, the movable member 250 is slid into engagement with the fixed member 240, such that rotation of the movable bayonets 230 about the axis A relative to the fixed base 210 is also restricted. Therefore, after the lens module 300 is assembled to the optical engine base 400 using the assembling mechanism 200 of the present embodiment, movement between the lens module 300 and the optical engine base 400 is restricted.

In the present embodiment, the movable sliding plate 254 is moved toward the fixed sliding plate 252 of the movable member 250, such that the positioning pins 256 of the movable member 250 are inserted into the positioning holes 242 of the fixed member 240, respectively. As such, with the engagement of the movable member 250 and the fixed member 240, rotation of the movable bayonets 230 about the axis A relative to the fixed base 210 is restricted.

The assembly process is described above with reference to FIGS. 4A-4D, and removal process is reverse to the operating steps of the assembly process.

Referring to FIG. 2 and FIG. 3, in the present embodiment, the assembling mechanism 200 may further include a fixed electrical connector 260 and a movable electrical connector 270. The fixed electrical connector 260 is fixedly connected to the fixed base 210, and the movable electrical connector 270 is fixedly connected to the movable connector 250. After the movable sliding plate 254 of the movable member 250 is moved, the fixed electrical connector 260 is coupled to the movable electrical connector 270.

In the present embodiment, the lens module 300 may include a motor 302 electrically connected to the movable electrical connector 270, and the fixed electrical connector 260 may be electrically connected to a mainboard (not shown) of the projector, such that when the fixed electrical connector 260 is coupled to the movable electrical connector 270, the motor 302 of the lens module 300 provides a torque under control of the mainboard.

In the present embodiment, the fixed electrical connector 260 may be a circuit board, and the movable electrical connector 270 may be a probe connector. A plurality of terminals of the probe connector may come into electrical contact with a plurality of nodes of the circuit board, respectively, to allow electrical signals to be transmitted therebetween.

Figure 4A:
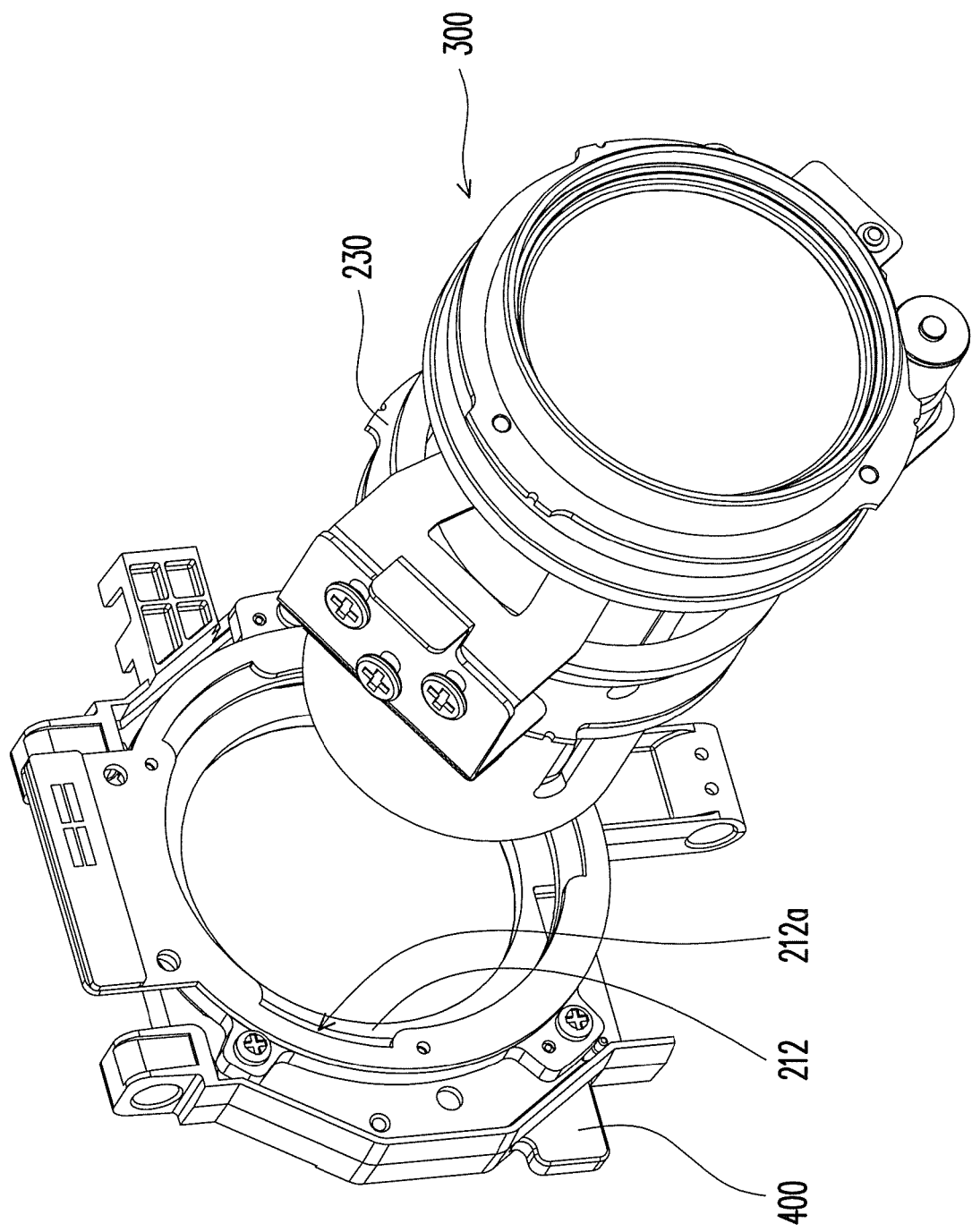
FIGS. 4A-4D are views showing the process of assembling the lens module to the optical engine base of FIG. 2 using the assembling mechanism.
Figure 4B:
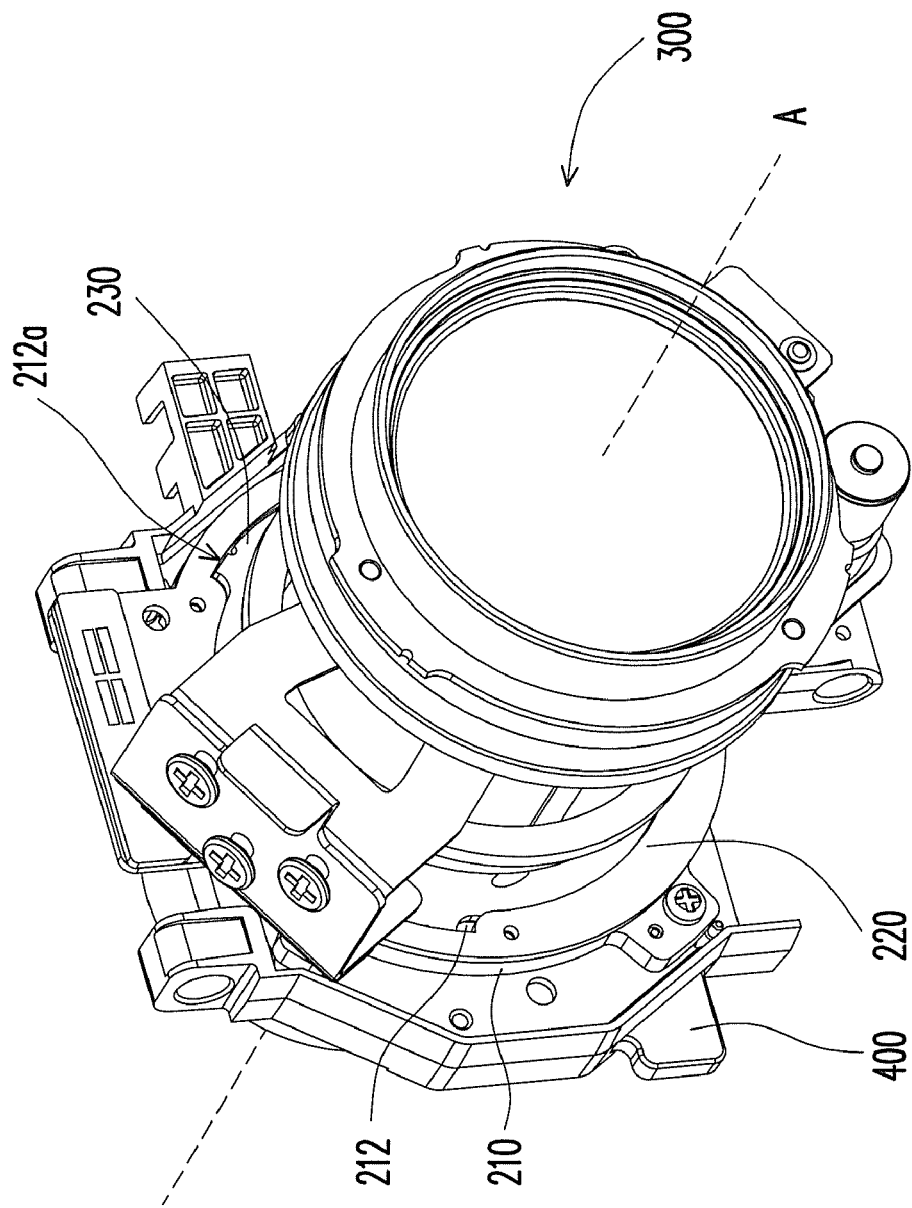
Figure 4C:
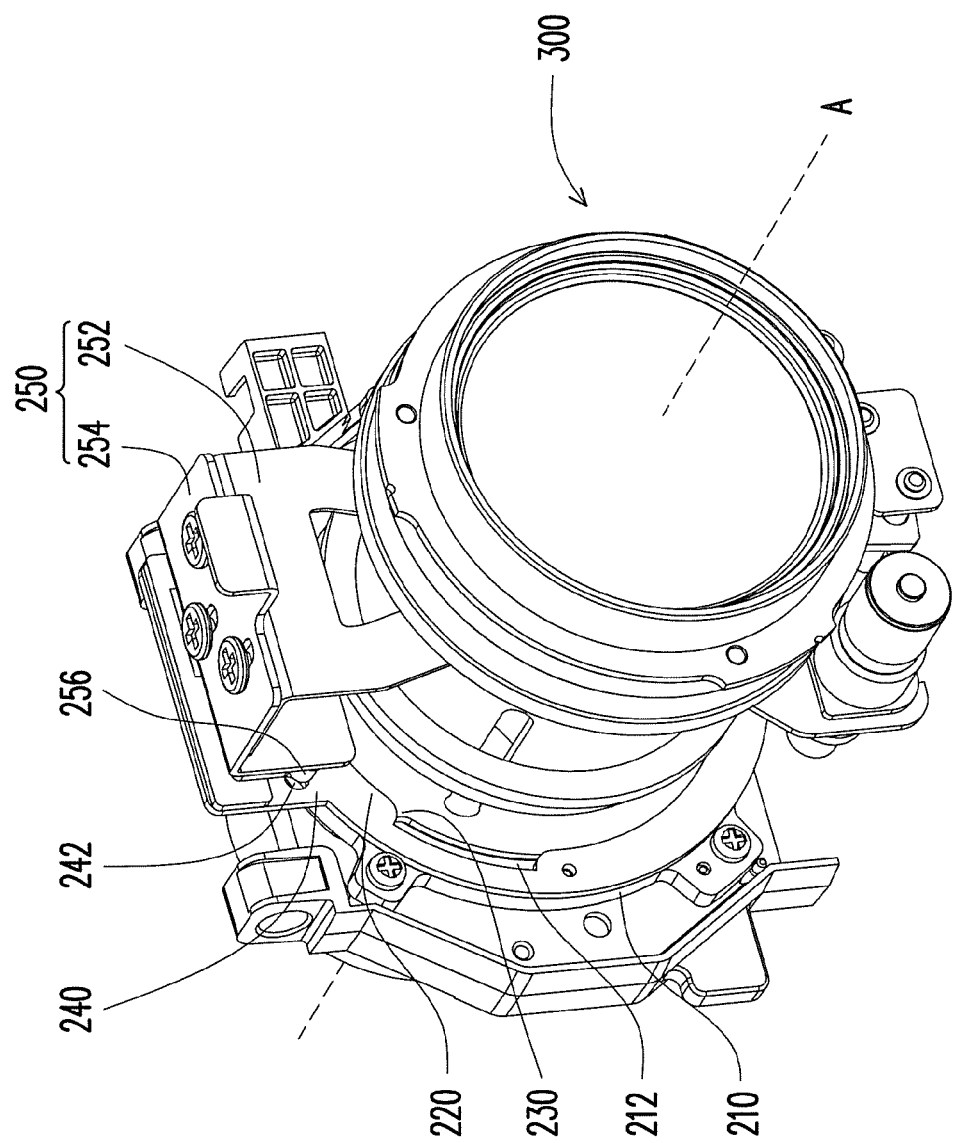
Figure 4D:
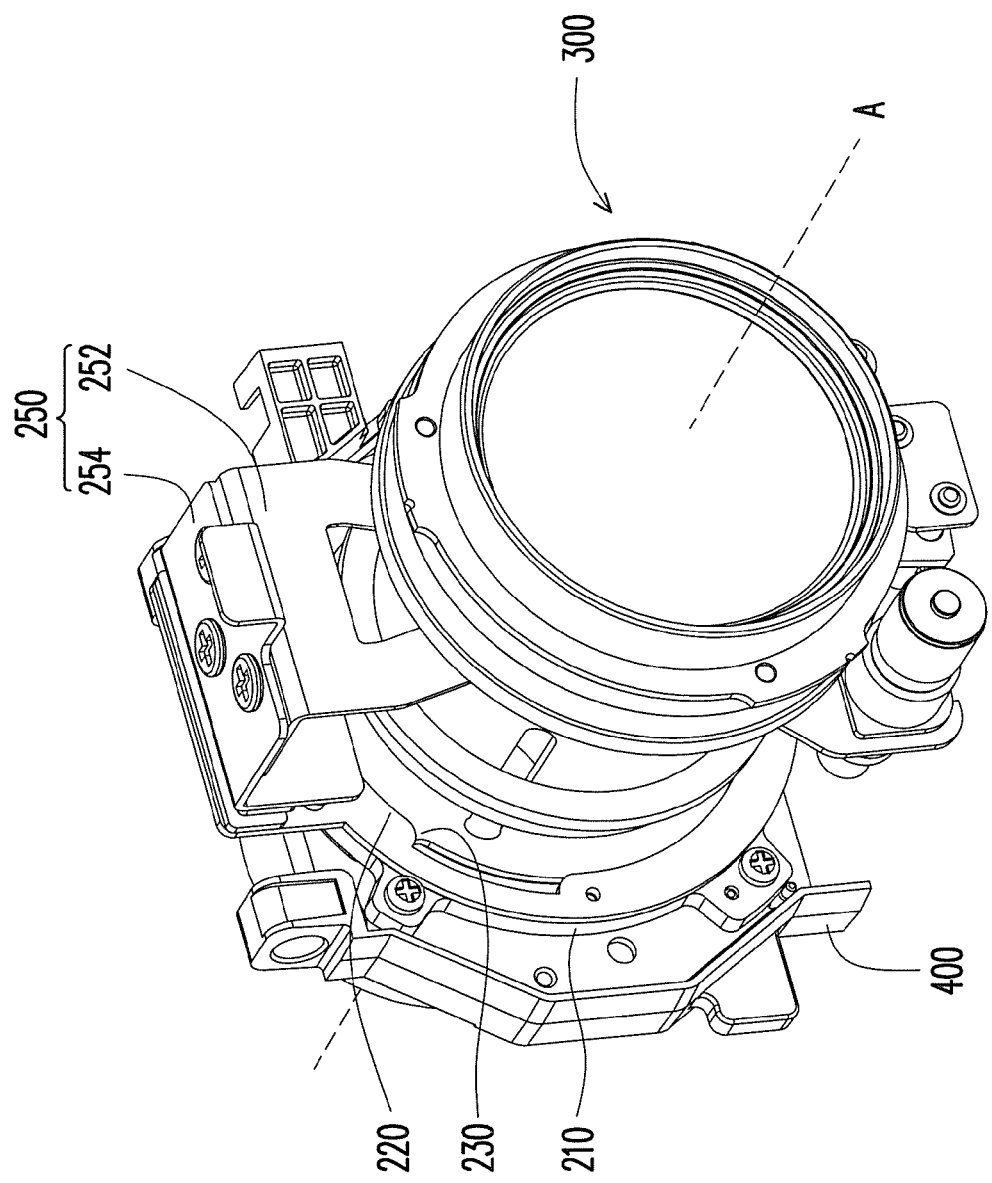
Figure 5:
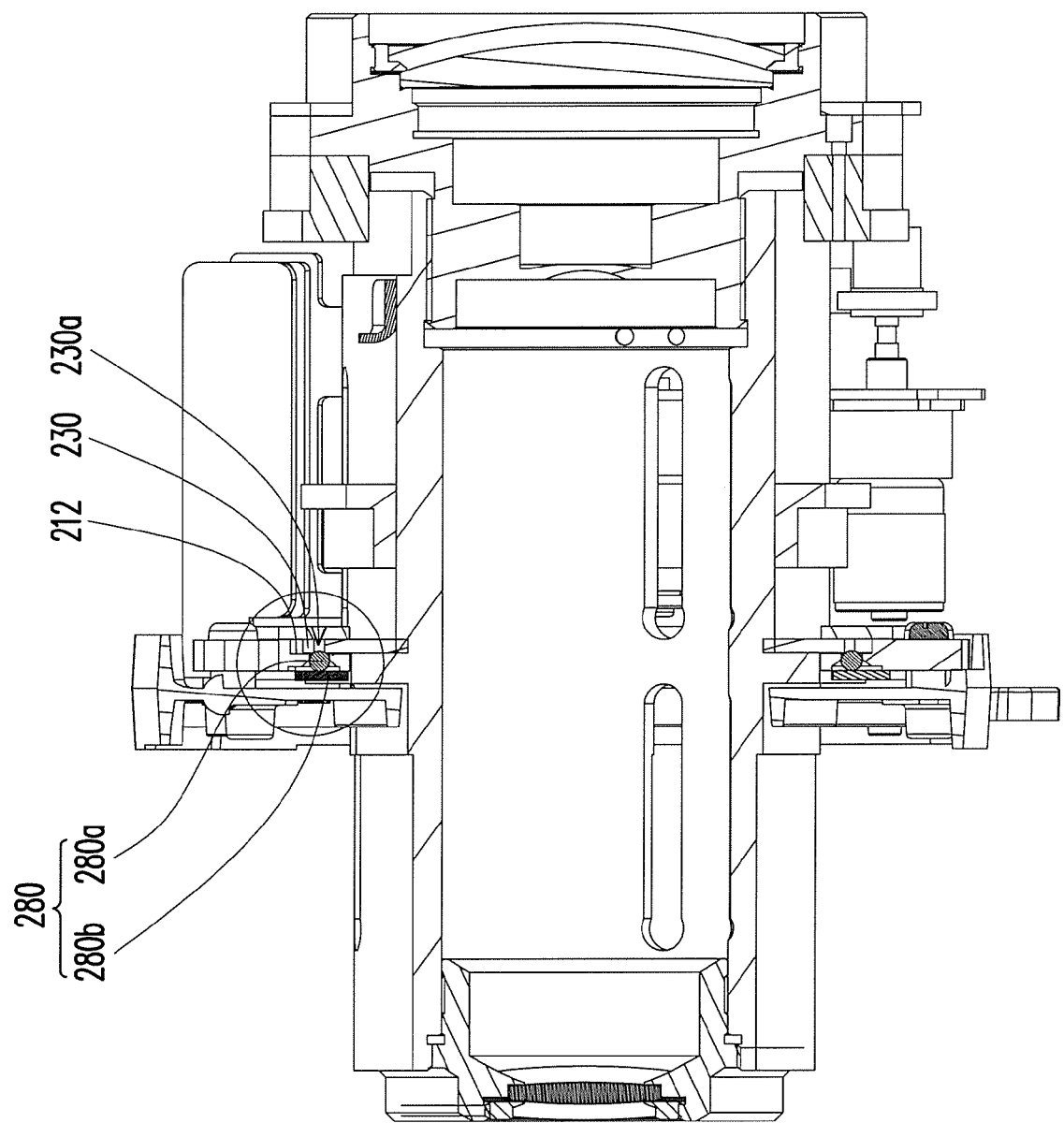
FIG. 5 is a cross-sectional view of the lens module and the optical engine base that have been assembled using the assembling mechanism of FIG. 4D.
Figure 6:
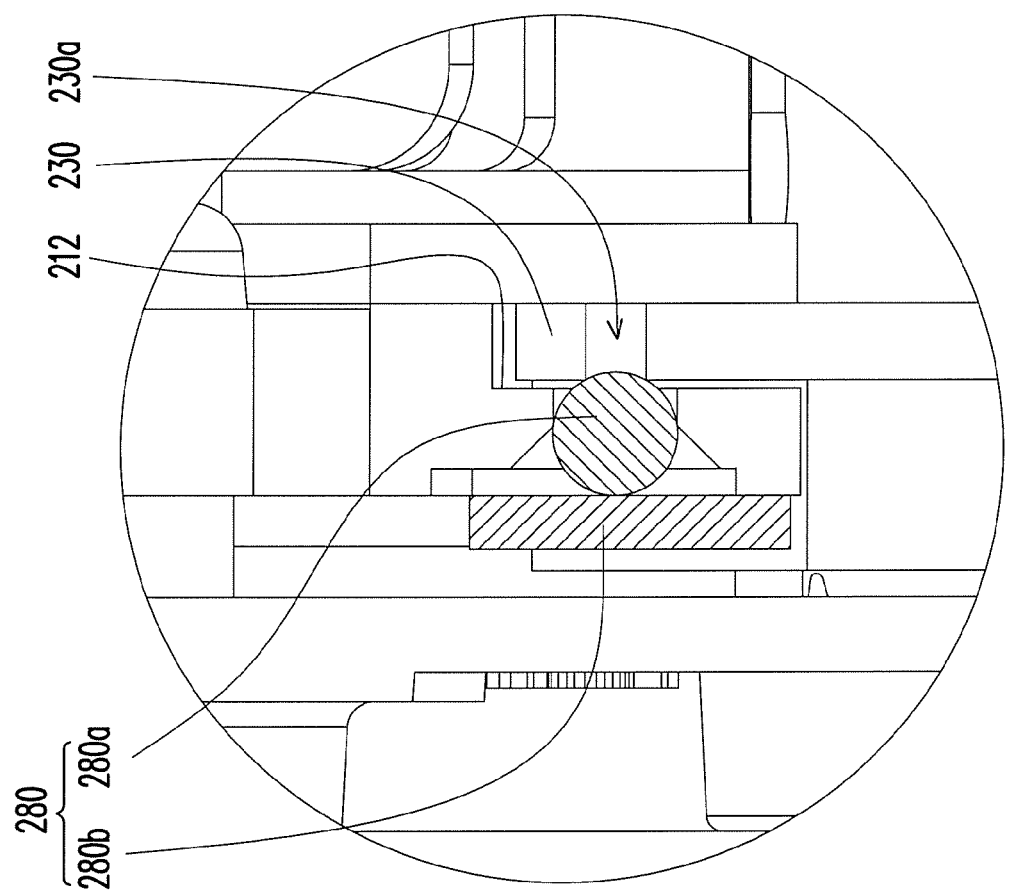
FIG. 6 is a partially enlarged view of FIG. 5.

FIG. 5 is a cross-sectional view of the lens module and the optical engine base that have been assembled using the assembling mechanism of FIG. 4D. FIG. 6 is a partially enlarged view of FIG. 5. Referring to FIGS. 5 and 6, in the present embodiment, the assembling mechanism 200 may further include a plurality of resilient pushing members 280 disposed on the fixed base 210. Each movable bayonet 230 comprises a notch 230a (see also FIG. 2 and FIG. 3). Each of the pushing members 280 may be engaged in a respective one of the notches 230a, so as to impart a stagnation feeling to the user during operation.

In the present embodiment, each of the resilient pushing members 280 includes a roller 280a and a resilient tab 280b (see also FIG. 2 and FIG. 3). The roller 280a is situated in the fixed base 210 and partially protrudes beyond a bottom surface of the restricting cavity 212. The resilient tab 280b is fixedly connected to the fixed base 210 and causes the roller 280a to partially protrude into the restricting cavity to engage the surface of the movable bayonet 230 where no notches are located. Therefore, when the movable bayonets 230 are rotated about the axis A to a specific position where the rollers 280a are engaged into respective notches 230a of the movable bayonet 230, a stagnation feeling is imparted to the user during operation for being indicative of reaching the target position, so as to prevent the user from exerting an unduly large torque.

In summary, by using the assembling mechanism of the above embodiment, tools are not required to assemble or remove the lens module of the projector, such that quick replacement of the lens module of the projector is achieved, so as to make repair of the lens module more convenient. Besides, in addition to providing the physical connection between the lens module and the optical engine base of the projector, the assembling mechanism of the above embodiment may also provide electrical connection between the lens module and the mainboard of the projector.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An assembling mechanism adapted to assemble a lens module of a projector to an optical engine base of the projector, the assembling mechanism comprising:
    a fixed base fixedly connected to the optical engine base and comprising a restricting cavity;
    at least one fixed bayonet fixedly connected to the fixed base and extending to an open end of the restricting cavity;
    at least one movable bayonet fixedly connected to the lens module;
    a fixed member fixedly connected to the optical engine base; and
    a movable member slidably connected to the lens module;
    wherein, displacement and rotation of the movable bayonet about the axis relative to the fixed base are restricted when the movable bayonet is moved into the restricting cavity through the open end of the restricting cavity and rotated about an axis relatively to the fixed base, and the movable member is slid into engagement with the fixed member.

2. The assembling mechanism according to claim 1, further comprising:
    a movable ring fixedly connected to the lens module, wherein the movable bayonet is fixedly connected to the movable ring.

3. The assembling mechanism according to claim 1, wherein the movable member comprises:
    a fixed sliding plate fixedly connected to the lens module and comprising at least one sliding block; and
    a movable sliding plate comprising at least one sliding slot, wherein the movable sliding plate is slidably disposed on the fixed sliding plate by engagement of the sliding block and the sliding slot.

4. The assembling mechanism according to claim 3, wherein the sliding block is a screw extending through the sliding slot and fixed to the fixed sliding plate.

5. The assembling mechanism according to claim 1, wherein the fixed member comprises at least one positioning hole and the movable member comprises at least one positioning pin configured for engagement in the positioning hole.

6. The assembling mechanism according to claim 1, further comprising:
   a fixed electrical connector fixedly connected to the fixed base; and
   a movable electrical connector fixedly connected to the movable member,
   wherein, the fixed electrical connector is coupled to the movable electrical connector when the movable bayonet is restricted from moving along the axis and rotated about the axis relatively to the fixed base.

7. The assembling mechanism according to claim 6, wherein the fixed electrical connector is a circuit board and the movable electrical connector is a probe connector.

8. The assembling mechanism according to claim 1, further comprising:
   at least one resilient pushing member disposed on the fixed base, wherein the movable bayonet comprises a notch, and the resilient pushing member is adapted to insert into the notch.

9. The assembling mechanism according to claim 8, wherein the resilient pushing member comprises:
   a roller situated in the fixed base and partially protruding into the restricting cavity; and
   a resilient tab fixedly connected to the fixed base and configured to cause the roller to resiliently partially protrude into the restricting cavity.

* * * * *